United States Patent Office 2,904,552
Patented Sept. 15, 1959

2,904,552

PRODUCTION OF NICOTINAMIDE AND ISONICOTINAMIDE

Edward James Gasson and David James Hadley, Epsom Downs, England, assignors to The Distillers Company Limited, Edinburgh, Scotland, a company of Great Britain No Drawing. Application July 21, 1958
Serial No. 749,625

14 Claims. (Cl. 260—295)

The present invention relates to the preparation of organic amides, and more particularly to the preparation of nicotinamide and isonicotinamide, from the corresponding cyanopyridine.

It has already been proposed to prepare nicotinamide by the partial hydrolysis of 3-cyanopyridine by means of an aqueous alkali solution containing a sufficient quantity of alkali to produce a larger proportion of nicotinamide than of nicotinate, but insufficient to produce a complete hydrolysis thereof. As alkalis, ammonia, an alkali hydroxide, alkali bicarbonate, alkali carbonate, alkali borate, alkali acid phosphate, alkali nicotinate, acetate or other organic salts of alkalis, hydroxides of the alkaline earth metals and also organic bases such as trimethylamine or triethylamine have been suggested. However, all these alkaline substances react with their equivalent of nicotinamide giving a salt of nicotinic acid together with ammonia. This involves a substantial loss of the desired product. Furthermore, the alkaline substances also catalyze the further hydrolysis of the amide to the ammonium salt, which increases still further the loss of amide. Accordingly, although reasonable yields may be achieved by the known process, the valuable starting material is partly converted into undesirable compounds so that efficiencies are not as high as is desirable. Moreover, when attempts are made to use the aforesaid catalysts for the hydrolysis of 4-cyanopyridine in order to produce isonicotinamide, indifferent results are obtained, since the alkaline catalysts—being more or less readily soluble in water—react with their equivalent of isonicotinamide giving a salt of isonicotinic acid together with ammonia, so that here again there is entailed a substantial loss of product corresponding to the amount of catalyst used.

It is an object of the invention to provide a process for the conversion of cyanopyridine containing a cyano group in one of the positions 3 or 4 into the corresponding nicotinic acid amide (nicotinamide or isonicotinamide), which process shows a high efficiency and in which the above mentioned losses are reduced to a minimum. As long as yields are not unreasonably low, say 50% or more, the most important factor in this process is the efficiency, since unreacted starting material may be recovered without difficulty and used again.

According to the present invention the process for the production of the desired amide with high efficiencies comprises hydrolyzing the starting 3-cyanopyridine or 4-cyanopyridine at elevated temperatures in an aqueous medium containing as a catalyst a compound having a solubility in water of not more than 0.1% at 20° C. and whose saturated aqueous solution at the same temperature has a pH value between 8 and 11, terminating the reaction when not more than about 75 to 80% of the cyanopyridine is converted to the corresponding nicotinic or isonicotinic acid amide, and recovering the latter and unreacted cyanopyridine from the reaction mixture. It is preferred to terminate the reaction at not more than 75% conversion of the 4-cyanopyridine into isonicotinamide, while the conversion of the 3-cyanopyridine may be allowed to continue until not more than 80% conversion into nicotinamide has taken place. It is however possible and even advantageous to terminate the reaction at lower conversions, for instance conversions of 50–60%, without a decrease in the efficiency, since excess of sparsely soluble catalyst can be readily removed from the reaction mixture, for instance by filtering, before the separation of the amide and the recovery of the unreacted cyanopyridine.

Compounds which are suitable as catalysts in the process of the invention are magnesium oxide and the carbonates of alkaline earths, e.g., calcium carbonate, barium carbonate or strontium carbonate. Magnesium oxide is the preferred catalyst.

The amounts of catalyst which may be used may vary within wide limits. A concentration in the range of 1 to 5% of, for instance, magnesium oxide based on the amount of cyanopyridine gives good results, while the carbonates of the alkaline earth metals may be used in higher concentrations, e.g. 5 to 10%. If, upon the termination of the reaction, any catalyst remains undissolved, it is preferred to remove it for instance by filtration or centrifuging.

The aqueous medium in which the hydrolysis is carried out may consist of water alone or may contain a proportion of a water-miscible solvent to increase the solubility therein of the cyanopyridine. Examples of such water-miscible solvents are, for instance, the lower aliphatic alcohols and ketones.

The useful concentration of cyanopyridine in the aqueous medium may vary within certain limits and depends, for instance, upon the manner in which it is intended to recover the unreacted cyanopyridine from the resulting reaction mixture. It has been found namely that during the distillation for this purpose, isonicotinamide is inclined to hold back the cyanopyridine. It is therefore preferred to operate the process of the invention with solutions of the cyanopyridine which do not exceed certain concentrations and which preferably contain not more than 15% by weight of cyanopyridine based on the aqueous medium. This proportion may be increased and solutions containing about 30% may be subjected to the hydrolyzing action if it is intended to recover the unreacted cyanopyridine from the reaction mixture by extraction with an organic solvent.

In order to obtain a satisfactory rate of reaction, the reaction is preferably carried out at temperatures in the region of 100° C. Somewhat higher temperatures up to 130° C. or more may be employed by the use of superatmospheric pressures. Under these conditions, reaction times of between about 2 and 20 hours, depending on the exact temperature chosen and the particular catalyst used, are satisfactory.

The process of the invention may be carried out batchwise or in a continuous manner.

In order to isolate the nicotinamide or isonicotinamide produced and to recover unreacted cyanopyridine, the mixture resulting from the reaction may be concentrated by distillation, preferably after undissolved catalyst has been removed. The distillate comprises unreacted cyanopyridine, water and a small quantity of ammonia which latter may be removed by passing the solution through ion-exchange resin. The residue from the distillation contains the amide, some water and a small amount of nicotinic or isonicotinic acid salts. This residue may be used without further purification to prepare derivatives of the amide or the last named compound may be isolated therefrom for instance by drying and subsequent extraction with a suitable solvent, for instance acetone or by crystallization from, for instance, water. As an alternative the aqueous mixture resulting from the hydrolyzing reaction may be extracted with a suitable solvent, preferably after the undissolved catalyst has been removed. Suitable solvents for the extraction are, for instance, benzene, toluene, carbon tetrachloride, petroleum ether and chloroform. These solvents will extract the unreacted cyanopyridine, which may be recovered by fractional distillation while the nicotinamide or isonicotinamide, as the case may be, remains dissolved in the aqueous medium. The amide is obtained therefrom by evaporating the water and extracting the dry residue with a solvent from the amide such as acetone or by recrystallization for instance from water. It is also possible to use the residue which contains some nicotinic or isonicotinic acid salts without further purification for the preparation of nicotinamide or isonicotinamide derivatives, respectively.

By operating in accordance with the present invention, efficiencies of the conversion of cyanopyridine into nicotinamide or isonicotinamide of 90 to 95% and more are obtainable, while the amounts of concurrently formed acid salts are kept to a minimum.

In this specification, yield is defined as the number of moles of cyanipyridine converted to nicotinamide or isonicotinamide multiplied by 100% and divided by the number of moles of cyanopyridine taken; efficiency is defined as the number of moles of cyanopyridine converted into nicotinamide or isonicotinamide multiplied by 100% and divided by the number of moles of cyanopyridine consumed in the process.

The following examples set forth presently-preferred representative embodiments of the invention. The parts are by weight.

Example 1

50 parts of 4-cyanopyridine, 2.5 parts of light magnesium oxide powder, and 1,000 parts of water, were boiled under reflux for eight hours, cooled and filtered to remove magnesium oxide. The magnesia was recovered almost quantitatively. The filtrate is distilled through a fractionating column whereby a distillate comprising water and unreacted cyanopyridine is obtained. The residue from the distillation is then heated in a current of air at 120° C. until a dry product results. The crude amide (47.5 parts) thus obtained was a white crystalline solid, melting point 153–154° C., containing, by analysis, 91.1% by weight of amide, 2.3% by weight of ammonium isonicotinate and 0.5% magnesium, the rest being water of crystallization. The 4-cyanopyridine recovered from the distillate by extraction with carbon tetrachloride amounted to 19.2%.

The amount of salt formation in this example was measured by estimation of the ammonia in the distillate and by analyzing the crude amide for ammonium isonicotinate.

The yields on the process were thus:

| | Percent |
|---|---|
| Amide (pure) | 73.7 |
| Isonicotinic acid salts | 3.5 |
| Recovered cyanopyridine | 19.2 |

The efficiency of conversion to amide was 91.1%.

Example 2

100 parts of 4-cyanopyridine, 1 part of magnesium oxide and 500 parts of water were heated in a rocking autoclave at 120° C. for 3 hours. Distillation of the product at atmospheric pressure gave a distillate containing unreacted cyanopyridine (39% recovery) and a residue containing crude amide (78 parts).

The yields obtained were:

| | Percent |
|---|---|
| Pure amide | 57.9 |
| Isonicotinic salts | 2.0 |
| Recovered cyanopyridine | 39.0 |

The efficiency of conversion to amide was 95%.

Example 3

8 parts of 4-cyanopyridine containing 1% of its weight of magnesium oxide (0.08 part) and 160 parts of water were heated in a sealed glass tube at 105° C. for eight hours. After filtration to recover magnesia (yield 0.04 parts) the solution was distilled to dryness.

The crude amide (7.46 parts) was found to be 90.0% pure, and to contain 1.0% of its weight of ammonium isonicotinate. Ammonia in the distillate showed that 4.1% of the cyanopyridine had been completely hydrolyzed.

The cyanopyridine extracted from the distillate was 19.3% of the quantity originally taken.

The yields were thus:

| | Percent |
|---|---|
| Amide | 72.2 |
| Isonicotinic salts | 4.7 |
| Recovered cyanopyridine | 19.3 |

The efficiency of conversion to amide was 89.5%.

Example 4

4-cyanopyridine, magnesia and water in the quantities given in Example 1, were heated in a rocking autoclave at 120–125° C. for three hours. Unreacted cyanopyridine was removed from the reaction mixture (after filtering off magnesia) by liquid-liquid extraction with benzene, and the aqueous phase distilled to dryness.

The yield of amide, melting point 155° C. (29.35 parts), was 50.3%.

The yields of all products were:

| | Percent |
|---|---|
| Amide | 50.3 |
| Isonicotinic salts | 1.9 |
| 4-cyanopyridine recovered | 47.8 |

The efficiency of conversion to amide was 95.8%.

Example 5

1 part of calcium carbonate was heated with 20 parts of 4-cyanopyridine and 400 parts of water for 17 hours under reflux. The products, worked up as in Example 5, yielded:

Isonicotinamide _____ 60.6% (calculated pure).
Recovered cyanopyridine ____ 38.0%.
Total isonicotinic salts _____ 1.45%.

The efficiency of conversion to the amide was 97.7%. The crude amide was 97% pure by analysis.

Example 6

This example was carried out similarly to Example 5, except that 1 part of barium carbonate was used as catalyst. The yields were as follows:

Amide _____ 68.8% (calculated pure).
Recovered 4-cyanopyridine __ 26.6%.
Total isonicotinic salts _____ 1.7%.

The efficiency of conversion to the amide was 93.6%.

The following experiment is given to demonstrate the superiority of the substantially neutral catalysts according to our invention compared with the alkaline catalysts previously proposed for the production of nicotinamide from 3-cyanopyridine.

2.17 grams of 4-cyanopyridine were dissolved in 10 ccs. of water and 0.1 gram of sodium carbonate was added. The solution was refluxed for three hours and after distilling off most of the water, was evaporated to dryness. Analysis of the amide-containing residue showed a yield of the pure amide of 74.5%. 8.6% of the starting material was recovered unchanged and yields of 8.6% of sodium isonicotinate were obtained. The efficiency of conversion of the 4-cyanopyridine to the amide amounts to 81.5%. The efficiency is thus considerably lower than can be achieved by following the process of the present invention.

Example 7

20 parts of 3-cyanopyridine, 100 parts of water and 2 parts of magnesium oxide were heated at 120° C. in a closed vessel for 6 hours.

Magnesia was removed by filtration from the cooled product, and unreacted 3-cyanopyridine by extraction with ether.

Distillation of the residual amide solution gave a 58% yield of nicotinamide M.P. 128°. The recovered 3-cyanopyridine amounted to 39% and the efficiency of conversion to amide was thus 95%.

Example 8

The starting materials as used in Example 7 were heated at 100° C. for 20 hours and the products worked up by filtration and evaporation followed by drying at 120° C. The yield of nicotinamide was 78%, and the recovered 3-cyanopyridine 19%. The efficiency of conversion to amide was 96%.

Example 9

5 parts of 3-cyanopyridine of purity 96.4%, 0.5 parts of calcium carbonate and 100 parts of water were heated under reflux for 20 hours, the mixture filtered to remove calcium carbonate, and the filtrate distilled at atmospheric pressure until about 80 parts had been collected as distillate. The residue was then heated at 100° C. and 20 mm. pressure to complete the removal of water. The residue, a white solid amounting to 3.70 parts contained by analysis 97% of nicotinamide, and melted at 127° C.

Continuous extraction of the distillate, with petroleum ether in a liquid-liquid extractor, and evaporation of the petroleum ether gave 35.6 parts of unreacted 3-cyanopyridine. The yield of nicotinamide was 61.2%, and the efficiency of converson of cyanopyridine to nicotinamide was 95.0%.

Example 10

5 parts of 3-cyanopyridine of purity 96.4%, 0.25 parts of barium carbonate and 100 parts of water were heated in a rocking autoclave at 120° C. for five hours, the cooled product filtered to remove barium carbonate, and distilled as in Example 9 to remove water and unreacted cyanopyridine. The nicotinamide obtained as distillation residue (3.64 parts) melted at 126° C., and contained by analysis 95.8% of nicotinamide. The yield of nicotinamide was 59.5%.

Recovery of cyanopyridine by extraction, as described in Example 9 gave 1.905 parts. The efficiency of conversion of cyanopyridine to nicotinamide was thus 96.1%.

The present application is a continuation-in-part of copending application, Serial No. 576,838, filed April 9, 1956, and also of copending application, Serial No. 569,231, filed March 5, 1956 (both of which applications have become abandoned since the filing of the present application).

Having thus disclosed the invention, what is claimed is:

1. Process for the manufacture of a member selected from the group consisting of nicotinamide and isonicotinamide from the corresponding cyanopyridine with an efficiency of at least about 90% with respect to the latter, which comprises hydrolyzing the cyanopyridine at elevated temperatures in an aqueous medium containing as catalyst a compound selected from the group consisting of magnesium oxide, calcium carbonate, barium carbonate and strontium carbonate, terminating the reaction when a conversion of the cyanopyridine into the nicotinamide and isonicotinamide, respectively, of not more than 80% is obtained, whereby the formation of corresponding nicotinates is essentially suppressed, and separating the amide produced from unreacted cyanopyridine in the reaction mixture.

2. Process for the manufacture of isonicotinamide from 4-cyanopyridine with an efficiency of at least about 90% with respect to the 4-cyanopyridine which comprises hydrolyzing 4-cyanopyridine in an aqueous medium at elevated temperatures in the presence of a compound, as catalyst, selected from the group consisting of magnesium oxide, calcium carbonate, barium carbonate and strontium carbonate, terminating the reaction when a conversion of the 4-cyanopyridine into isonicotinamide of not more than 75% is obtained, whereby the formation of isonicotinate is essentially suppressed, and separating isonicotinamide produced from unreacted 4-cyanopyridine in the reaction mixture.

3. Process according to claim 2 wherein magnesium oxide is used as catalyst.

4. Process according to claim 2 wherein the catalyst used is selected from the group consisting of the carbonates of calcium, barium and strontium.

5. Process according to claim 2 wherein the reaction temperature in the mixture is in the range of about 100° C. and 130° C.

6. Process according to claim 2 wherein the 4-cyanopyridine in the aqueous medium is at a concentration of less than 15% and the recovery of unreacted 4-cyanopyridine from the resulting reaction mixture is carried out by distillation.

7. Process according to claim 6 wherein the ammonia contained in the resultant aqueous distillate is removed by means of an ion-exchange resin.

8. Process according to claim 2 wherein the 4-cyanopyridine in the aqueous medium is at a concentration of more than 15 and up to about 30% and the unreacted 4-cyanopyridine is recovered from the aqueous reaction mixture by extraction with an organic solvent for cyanopyridine.

9. Process for the manufacture of nicotinamide from 3-cyanopyridine with an efficiency of the order of 95% and more which comprises hydrolyzing 3-cyanopyridine at elevated temperatures in an aqueous medium containing as catalyst a compound selected from the group consisting of magnesium oxide, calcium carbonate, barium carbonate and strontium carbonate, terminating the reaction when not more than 80% of the 3-cyanopyridine is converted into nicotinamide, whereby the formation of nicotinate is essentially suppressed, and recovering nicotinamide produced and unreacted 3-cyanopyridine from the reaction mixture.

10. Process according to claim 9 wherein magnesium oxide is used as catalyst.

11. Process according to claim 9 wherein the catalyst used is selected from the group consisting of the carbonates of calcium, barium and strontium.

12. Process according to claim 9 wherein the reaction temperature in the mixture is in the range of about 100° C.–130° C.

13. Process according to claim 9 wherein the recovery of unreacted 3-cyanopyridine from the resulting mixture is carried out by distillation.

14. Process according to claim 13 wherein the ammonia contained in the resultant aqueous distillate is removed by means of an ion-exchange resin.

No references cited.

UNITED STATES PATENT OFFICE

CERTIFICATE OF CORRECTION

Patent No. 2,904,552 September 15, 1959

Edward James Gasson et al.

It is hereby certified that error appears in the above numbered patent requiring correction and that the said Letters Patent should read as corrected below.

In the heading to the printed specification, between lines 9 and 10, insert -- Claims priority, application Great Britain March 25, 1955 --.

Signed and sealed this 17th day of May 1960.

(SEAL)
Attest:

KARL H. AXLINE
Attesting Officer

ROBERT C. WATSON
Commissioner of Patents